United States Patent
Moritz et al.

(10) Patent No.: US 12,536,535 B2
(45) Date of Patent: Jan. 27, 2026

(54) SYSTEMS AND METHODS FOR PROVIDING A VIRTUAL SAFETY DEPOSIT BOX FOR REMOTE ACCESS TO STORED DIGITAL AND VIRTUAL CONTENT

(71) Applicant: Mastercard International Incorporated, Purchase, NY (US)

(72) Inventors: Jason Rande Moritz, Chesterfield, MO (US); Jeremiah L. Davis, Lake St. Louis, MO (US); Devendran A. Sriramanane, Grover, MO (US); Stephanie Jeanne Owen Welsh, St. Louis, MO (US); Kathy Ann Simon, St. Peters, MO (US); Daniel Edward Miller, Manchester, MO (US)

(73) Assignee: Mastercard International Incorporated, Purchase, NY (US)

( * ) Notice: Subject to any disclaimer, the term of this patent is extended or adjusted under 35 U.S.C. 154(b) by 273 days.

(21) Appl. No.: 17/408,238

(22) Filed: Aug. 20, 2021

(65) Prior Publication Data
US 2023/0058572 A1 Feb. 23, 2023

(51) Int. Cl.
*G06Q 20/40* (2012.01)
*G06Q 20/32* (2012.01)

(52) U.S. Cl.
CPC ..... *G06Q 20/4014* (2013.01); *G06Q 20/3276* (2013.01); *G06Q 20/4015* (2020.05); *G06Q 20/405* (2013.01)

(58) Field of Classification Search
CPC ........... G06Q 20/4014; G06Q 20/4015; G06Q 20/3276; G06Q 20/405
See application file for complete search history.

(56) References Cited

U.S. PATENT DOCUMENTS

| | | | |
|---|---|---|---|
| 8,280,814 B2 * | 10/2012 | Lipkin | G06Q 30/06 705/43 |
| 8,401,969 B2 | 3/2013 | Regep, II | |
| 8,577,805 B1 | 11/2013 | Oakes, III et al. | |
| 9,646,450 B2 | 5/2017 | Melik-Aslanian et al. | |
| 10,693,872 B1 * | 6/2020 | Larson | H04L 63/0861 |
| 11,049,202 B2 | 6/2021 | Feinberg et al. | |
| 2009/0080708 A1 | 3/2009 | Mellen et al. | |

(Continued)

*Primary Examiner* — Neha Patel
*Assistant Examiner* — Davida Lee King
(74) *Attorney, Agent, or Firm* — Armstrong Teasdale LLP

(57) ABSTRACT

Described are systems and methods for providing virtual and remote access to virtual content in a virtual safebox. A computer system includes a virtual vault database for storing a plurality of virtual safeboxes storing digital/virtual content provided by a user. The stored content includes image content representing personal identification documents of the user. The computing device includes at least one processor configured to receive an access request message from a first safebox access computing device and, in response retrieve, from the virtual vault database, the first virtual safebox. The processor is further configured to generate an inventory list identifying each content item and transmit an inventory message to the first safebox access computing device. The processor is further configured to receive a content retrieval message from the first safebox access computing device and transmit a content message to the first safebox access computing device.

20 Claims, 5 Drawing Sheets

(56) References Cited

U.S. PATENT DOCUMENTS

| | | | |
|---|---|---|---|
| 2010/0131287 A1 | 5/2010 | Terry | |
| 2012/0215688 A1* | 8/2012 | Musser | G06Q 20/40 |
| | | | 705/40 |
| 2013/0290710 A1* | 10/2013 | Broder | G06Q 30/04 |
| | | | 713/168 |
| 2015/0100486 A1* | 4/2015 | Green | G06Q 20/227 |
| | | | 705/41 |
| 2016/0012465 A1* | 1/2016 | Sharp | G06Q 20/321 |
| | | | 705/14.17 |
| 2019/0370787 A1* | 12/2019 | Mueller | G06Q 20/027 |
| 2020/0193421 A1 | 6/2020 | Malhotra et al. | |
| 2021/0209689 A1 | 7/2021 | Decanini et al. | |

* cited by examiner

SYSTEMS AND METHODS FOR PROVIDING A VIRTUAL SAFETY DEPOSIT BOX FOR REMOTE ACCESS TO STORED DIGITAL AND VIRTUAL CONTENT

BACKGROUND

The field of the present disclosure relates generally to providing virtual and remote access to digital and/or virtual content stored in a virtual safety deposit box ("safebox") and, more particularly, to systems and methods for providing a user with one or more content items stored in the virtual safebox via an access computing device.

It is not uncommon for a person to lose, misplace, or have stolen their important person items, such as a payment card (e.g., credit or debit card), a wallet, personal identification such as driver's license or passport, and/or their mobile phone (e.g., smartphone). In some cases, the person may be traveling and lose these personal items (e.g., wallet and phone). Unfortunately, in such circumstances, the person no longer has access to funds to purchase a replacement mobile phone and/or funds for any other travel expenses, such as hotel accommodations and/or transportation. Furthermore, where the person has also lost their personal identification, the person may be unable to perform certain essential tasks, such as check in to a hotel or flight, or access their funds from a bank in the typical fashion.

Accordingly, it may be advantageous to enable remote access to these essential personal items from one or more secure locations, without requiring a payment device and/or personal computing device to be physically present.

BRIEF DESCRIPTION

In one aspect, a safebox computing system for providing remote access to content stored in a virtual safebox is provided. The computer system includes a virtual vault database storing a plurality of virtual safeboxes associated with a respective plurality of users. Each virtual safebox has a user identifier identifying the user that is a registered owner of the virtual safebox. Each virtual safebox stores content provided by the respective user during a registration process. The content includes image content representing personal identification documents of the respective user and is accessible via a distributed network of safebox access computing devices. The computing device includes at least one processor in communication with the virtual vault database and each safebox access computing device of the distributed network of safebox access computing devices. The at least one processor is programmed to receive an access request message from a first safebox access computing device of the distributed network of safebox access computing devices. The access request message includes a first user identifier of a first user of the first safebox access computing device. The first user identifier is associated with a first virtual safebox stored in the virtual vault database. The processor is further programmed to, in response to receiving the access request message, retrieve, from the virtual vault database, the first virtual safebox by performing a lookup operation using the first user identifier. The processor is further programmed to transmit an inventory message to the first safebox access computing device. The inventory message includes an inventory list identifying each content item of the content stored in the first virtual safebox and instructions that cause the first safebox access computing device to display the inventory list on a display of the first safebox access computing device. The processor is further programmed to receive a content retrieval message from the first safebox access computing device. The content retrieval message including a request to retrieve a user-selected first content item included in the inventory list, from the content stored in the first virtual safebox. The processor is further programmed to transmit a content message to the first safebox access computing device. The content message includes the requested first content item.

In another aspect, a computer-implemented method for providing remote access to content stored in a virtual safebox is provided. The method is implemented using a computing device including a processor in communication with at least one memory device for storing data. The method includes a virtual vault database storing a plurality of virtual safeboxes associated with a respective plurality of users. Each virtual safebox has a user identifier identifying the user that is a registered owner of the virtual safebox. Each virtual safebox stores content provided by the respective user during a registration process. The content includes image content representing personal identification documents of the respective user and is accessible via a distributed network of safebox access computing devices. The computing device includes at least one processor in communication with the virtual vault database and each safebox access computing device of the distributed network of safebox access computing devices. The method includes receiving an access request message from a first safebox access computing device of the distributed network of safebox access computing devices. The access request message includes a first user identifier of a first user of the first safebox access computing device. The first user identifier is associated with a first virtual safebox stored in the virtual vault database. The method includes, in response to receiving the access request message, retrieving, from the virtual vault database, the first virtual safebox by performing a lookup operation using the first user identifier. The method further includes transmitting an inventory message to the first safebox access computing device. The inventory message includes an inventory list identifying each content item of the content stored in the first virtual safebox and instructions that cause the first safebox access computing device to display the inventory list on a display of the first safebox access computing device. The method further includes receiving a content retrieval message from the first safebox access computing device. The content retrieval message includes a request to retrieve a user-selected first content item included in the inventory list, from the content stored in the first virtual safebox. The method further includes transmitting a content message to the first safebox access computing device. The content message includes the requested first content item.

In a further aspect, a non-transitory computer-readable storage medium that includes computer-executable instructions is provided. When executed by a computing device including a processor and in communication with a virtual vault database and a distributed network of safebox access computing devices, the computer-executable instructions cause the processor to store, in the virtual vault database, a plurality of virtual safeboxes associated with a respective plurality of users. Each virtual safebox has a user identifier identifying the user that is a registered owner of the virtual safebox. Each virtual safebox stores content provided by the respective user during a registration process. The content includes image content representing personal identification documents of the respective user and is accessible via the distributed network of safebox access computing devices. The computer-executable instructions also cause the processor to receive an access request message from a first safebox access computing device of the distributed network of safebox access computing devices. The access request message includes a first user identifier of a first user of the first safebox access computing device. The first user identifier is associated with a first virtual safebox stored in the virtual vault database. The computer-executable instructions cause the processor to, in response to receiving the access request message, retrieve, from the virtual vault database, the first virtual safebox by performing a lookup operation using the first user identifier. The computer-executable instructions cause the processor to transmit an inventory message to the first safebox access computing device. The inventory message includes an inventory list identifying each content item of the content stored in the first virtual safebox and instructions that cause the first safebox access computing device to display the inventory list on a display of the first safebox access computing device. The computer-executable instructions cause the processor to receive a content retrieval message from the first safebox access computing device. The content retrieval message including a request to retrieve a user-selected first content item included in the inventory list, from the content stored in the first virtual safebox. The computer-executable instructions also cause the processor to transmit a content message to the first safebox access computing device. The content message includes the requested first content item.

BRIEF DESCRIPTION OF THE DRAWINGS

FIG. 1 is a simplified schematic diagram of an example virtual safebox system including a safebox system computing device for enabling remote access to digital and/or virtual content stored in a virtual vault database via a distributed network of safebox access computing devices;

FIG. 2 illustrates an example display screen of a safebox access computing device, as shown in FIG. 1;

FIG. 3 is a process flow diagram of an example method implemented using the virtual safebox system shown in FIG. 1;

FIG. 4 is an example schematic configuration of a safebox access computing device that may be used in the virtual safebox system shown in FIG. 1; and FIG. 5 illustrates an example configuration of a server computing device that may be used in the virtual safebox system shown in FIG. 1.

DETAILED DESCRIPTION

Figure 1:
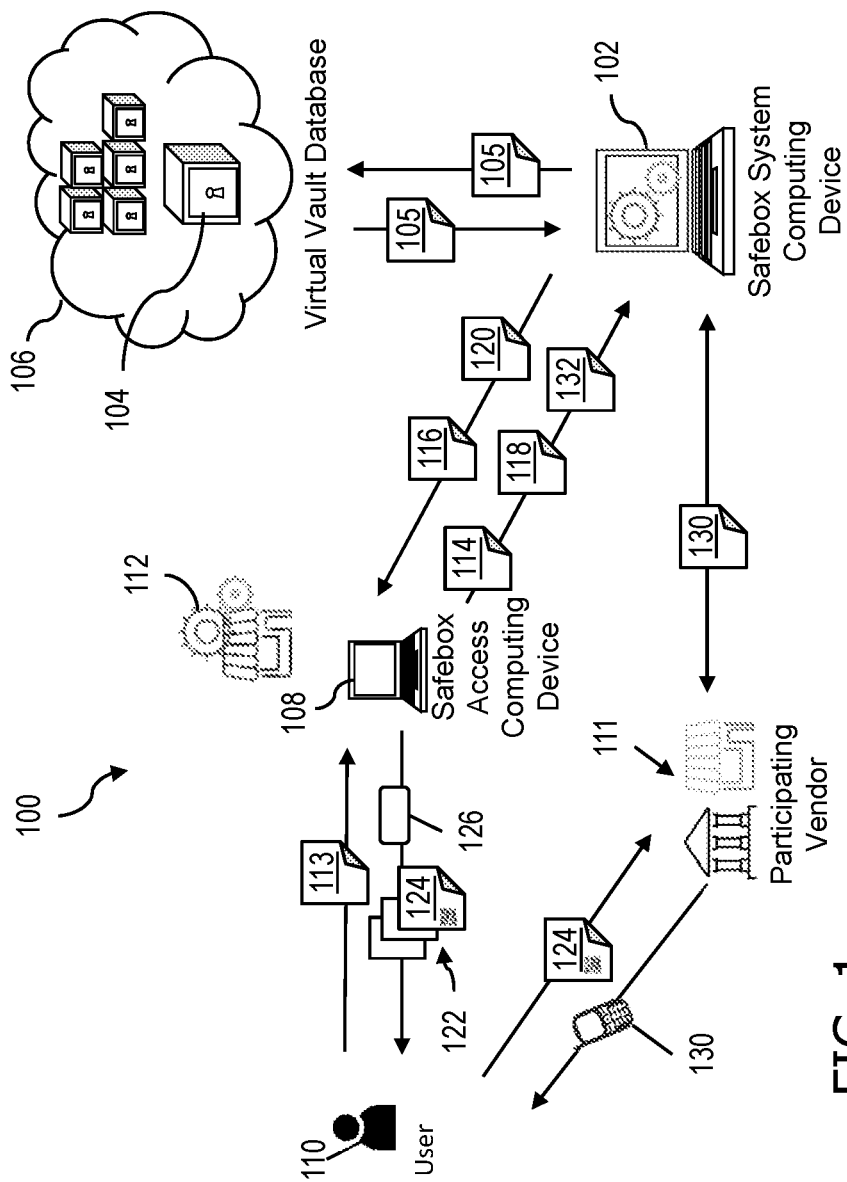
FIGS. 1-5 show example embodiments of the methods and systems described herein.

The systems and methods described herein are directed to providing persons (referred to herein as "users" and/or "cardholders") with remote access to digital and/or virtual content stored in a virtual safebox, particularly in situations in which the person lacks a physical payment device (e.g., a payment card, digital wallet, etc.), physical personal identification document(s) (e.g., driver's license or passport), and/or their mobile computing device (e.g., smartphone). The digital and/or virtual content may include copies of and/or access to virtual representations of these missing physical items, such as copies of identification document(s), vouchers, and/or funds from one or more payment accounts (e.g., in the form of a pre-paid card funded by a debit account or as a cash advance on a credit line). The user, who is the registered owner of their virtual safebox, may access the virtual content contained within their virtual safebox at any one of a distributed network of safebox access computing devices. The plurality of safebox access computing devices positioned at a plurality of locations allows users to choose a convenient location at which to access their digital and/or virtual content.

For example, in some known circumstances, a user of the virtual safebox system may have lost or had their wallet stolen, the wallet containing various payment devices (e.g., payment cards, cash, etc.), and their personal computing device, such as their smartphone. The user of the virtual safebox system has arranged a preemptive measure for such circumstances, by providing digital and/or virtual content to be stored within a virtual safebox of the virtual safebox system. The safebox system allows the user access to the digital and/or virtual content stored within their virtual safebox without requiring the user to have possession of a physical payment card, a payment card number, and/or any kind of physical identification document(s), such as a passport or driver's license, that are typically used to verify and/or authenticate a user. The user merely has to provide a user identifier and one or more identification credentials, as described further herein, in order for the user to access their digital and/or virtual content via any one of the safebox access computing devices. Accordingly, the user may not be "stranded" without their personal items and can easily and securely access and/or replace their lost items.

As used herein, "digital" content may refer to stored content that is a digital (computerized) version of physical content, such as digital image copies of personal identification document(s). "Virtual" content may refer to content without an original physical corollary, such as vouchers that originate within the safebox system. However, "digital" and "virtual" may be used interchangeably, to refer to any content that is electronically stored and accessible through the safebox system as described herein.

In the example embodiment, the user may register and/or enroll with the safebox system during a registration phase. During the registration phase, the user provides various identifying information that can be used to authenticate them when they have no physical personal identification, as well as various content items that they wish to store in their virtual safebox. In some example embodiments, the user may communicate their information to a centralized safebox system computing device that manages storage of digital/virtual content in the virtual safeboxes and retrieval of digital/virtual content therefrom. The user may communicate with the safebox system computing device by transmitting one or more messages from their user computing device, such as their smartphone, laptop computer, desktop computer, tablet, and the like. In other example embodiments, the user may communicate their content (e.g., during the registration phase or at a late time) with the safebox system computing device via one or more safebox access computing devices.

The user may provide information such as a user identifier, one or more identification credentials, payment card or payment account information, copies of personal identification document(s), and/or additional or alternative information and/or data associated with the user during the registration phase. In some example embodiments, the safebox system computing device may assign a user identifier, uniquely identifying the user, to the user during the registration phase. In other example embodiments, the user identifier may by an identifier that the user provides and that would easily remembered by the user, such as a telephone number or email address.

Upon registration, the safebox system computing device creates a virtual safebox having the user identifier assigned thereto, for storage of the identification credentials and digital/virtual content within the virtual safebox that is registered to the user. The virtual safebox is one or more memory locations in a centralized or distributed database—referred to herein as a virtual vault—that are allocated to store digital/virtual content associated with the user, indexed according the user identifier such that all digital/virtual content associated with the user is easily and quickly retrieved based on a single data element (i.e., the user identifier).

The user also provides identification credentials during the registration phase. The identification credentials include data elements used to authenticate the user when the user interacts with a safebox access computing device and/or requests digital/virtual content from their safebox. The identification credentials may include one or more biometric identifiers (e.g., fingerprints, content for facial recognition, content for retinal scanning, and the like), a password, a personal identification number (PIN), and/or other codes or data that uniquely identify the user. The identification credentials are stored in the virtual safebox for access during an authentication process, as described further herein. The identification credentials (and/or any other digital/virtual content) may be encrypted before storage, to prevent unauthorized access thereof.

The user may provide additional content for storage in their virtual safebox, such that the content will be available for remote access as digital/virtual content. In the example embodiment, the content provided by the user includes payment credentials associated with at least one payment account of the user from which funds may be withdrawn via a safebox access computing device, for example, in the form of a prepaid payment card issued to the user and/or cash (and/or, in some embodiments, as a money order, a replacement or reissue of their existing payment card, etc.). The user may provide the payment credentials manually (e.g., by typing in a payment card number or account number and/or other data elements, such as an expiration date and/or verification number, and/or by providing an image of the payment card). Additionally or alternatively, the user may provide their payment credentials from within an issuer website or software app. For example, the user may select an option to add the payment credentials to their virtual vault (similar to adding payment credentials to a digital wallet). The payment credentials are stored such that the associated payment account, and/or funds therefrom, is accessible to the user via the safebox access computing devices (e.g., for withdrawal of funds therefrom).

The digital/virtual content may additionally include one or more records, such as copies of personal identification documents, passports, driver's licenses, resident IDs, medical records, prescriptions, and the like. For example, the user may provide image content including any of the above records for storage in the virtual safebox (e.g., by capturing an image using a camera of their user computing device, using a scanner, and/or by mailing a physical copy to an address associated with the virtual safebox system for subsequent scanning and storage). In some example embodiments, the virtual safebox station may also store additional or alternative digital/virtual content selected and/or provided by the cardholder. For example, the virtual safebox may store contact information (e.g., telephone numbers, e-mail, etc.) provided by the user. In some cases, the user may upload all of their contacts from their personal computing device to the virtual safebox. In other cases, the user may select certain specific contacts (e.g., family members, emergency contacts, doctors, neighbors, etc.) to store in the virtual safebox.

In some embodiments, the digital/virtual content includes content not specifically provided by the user but accessible to the user within the virtual safebox. For example, the digital/virtual content may include one or more vouchers that may be redeemed at one or more participating vendors. The voucher(s) may be provided by the safebox system computing device for selection by the user during the registration process. For example, the user may select a voucher for a phone that is associated with their mobile carrier, or for a hotel chain that the user frequents. Alternatively, the voucher(s) may be added, provided, and/or accessed "on-the-fly" when a user requests access their virtual safebox. The safebox system computing device may identify a location of the first user and perform a lookup in a database of available vouchers (which may be the same as or different from the virtual vault) using the location. The safebox system computing device may thereby retrieve available vouchers from participating vendors that are physically proximate to the user (e.g., restaurants, hotels, etc.).

It should be understood that the user may provide content for storage in the virtual safebox at any time, and the above-described processes are not limited to a single, one-time registration phase. For example, after registration, the user may transmit one or more messages to the safebox system computing device to modify or update digital/virtual content stored within the virtual safebox registered to the user at any time.

The safebox system computing device of the present disclosure is communicatively coupled to a virtual vault database. The virtual vault database is a centralized or distributed database that stores a plurality of virtual safeboxes, each associated with a respective user.

A user may access their digital/virtual content from the virtual vault at any one of the safebox access computing devices of the distributed network. In the example embodiment, each safebox access computing device disposed at a dedicated station. Each safebox access computing device in the distributed network is communicatively coupled to the safebox system computing device. Dedicated stations may include for example, financial institutions, hotels, pharmacies, merchants, transportation hubs (e.g., airports, train stations, bus stations, etc.), and/or libraries. The dedicated stations may be registered with the safebox system, during a registration phase, and are authorized by the safebox system to support the safebox access computing devices.

Each dedicated station may provide one or more content items to a user and has some or all of the capabilities needed to provide access to a user's digital/virtual content. For example, the dedicated station may hold cash, may be able to issue prepaid cards, may have a printer to print money orders and/or images of stored records or vouchers, and/or may have other hardware or capabilities associated with providing access to physical items represented by virtual content contained in a virtual safebox. In some example embodiments, one or more of the dedicated safebox stations may include a stand-alone machine, such as a kiosk and/or an automated teller machine (ATM) that supports the access computing device. In some other example embodiments, the safebox stations may be supported by any internet-based computing device. For example, in some embodiments, the user may access their virtual safebox using a personal computing device, such as a cellular phone, laptop, and/or other computing device. In some example embodiments, an employee and/or a teller at the dedicated station may facilitate communication between the user and the safebox access computing device.

Users may interact with the safebox access computing device to access the functionality of the safebox system computing device—that is, to access their virtual safebox—by transmitting messages to and receiving messages from the safebox system computing device via the safebox access computing device. Each safebox access computing device includes a user interface that enables the user to input information to and receive information from the safebox access computing device, such as a display, touch screen, keyboard, mouse, camera, fingerprint scanner, retinal scanner, microphone, speakers, and the like. The centralized safebox system computing device transmits messages to the safebox access computing device including instructions that cause the safebox access computing device to display information to the user. The instructions may also cause the safebox access computing device to prompt the user to provide information (e.g., as user input) to the safebox access computing device.

The user may access the contents of their virtual safebox by providing the safebox access computing device with their user identifier and one or more identification credentials, such as biometrics, a password, a PIN, and the like. The identification credentials input by the user to the safebox access computing device may depend on the physical capabilities or attributes of the safebox access computing device. For example, the user cannot provide a fingerprint if the safebox access computing device does not include a fingerprint scanner, but may provide a password and social security number via a keyboard and/or mouse. The safebox access computing device transmits an authentication message to the safebox system computing device, the authentication message including the user identifier and the input identification credentials, to initiate an authentication process to authenticate the user.

Upon receiving the authentication message including the user identifier and the input identification credentials, the safebox system computing device accesses the virtual vault database to retrieve a virtual safebox assigned to the user identifier. Specifically, the safebox system computing devices performs a lookup operation using the input user identifier to retrieve the virtual safebox (i.e., any content stored with the index of the user identifier). The safebox system computing device compares the received identification credentials to the identification credentials stored in the virtual safebox. If the identification credentials match, the user is authenticated and is able to access the contents of their virtual safebox. If the identification credentials do not match, the user may be prompted to attempt authentication again and/or input alternative identification credentials. In some embodiments, the user may be required to input a particular number or type of authentication credentials, depending on various factors, such as user preferences, safebox access computing device capabilities, and the like.

Once the user is successfully authenticated, the safebox system computing device transmits one or more content messages to the safebox access computing device, including an inventory list identifying the digital/virtual content that is stored in the virtual safebox owned by the authenticated user. Upon receiving the content message, the safebox access computing device may display the inventory list to the user and prompt the user to select one or more content items that the user wishes to withdraw from the virtual safebox.

In the example embodiment, after the user has selected digital/virtual content to be withdrawn, the safebox access computing device transmits a content retrieval message to the safebox system computing device requesting the selected item(s). In response to receiving the content retrieval message, the safebox system computing device retrieves the user-selected content items from the virtual safebox registered to the user, and transmits the retrieved content items to the safebox access computing device.

For example, the user may select to withdraw a voucher and funds from their payment account (identified by stored payment credentials) in the form of a prepaid payment card. The safebox access computing device may transmit the content retrieval message to the safebox system computing device, including a request to retrieve the user-selected items of the voucher and funds (to be issued on the prepaid payment card). In response, the safebox system computing device transmits the content message to the safebox access computing device, including the requested content items. Specifically, continuing with the above example, the content message includes image content of the selected voucher and instructions for the safebox access computing device to issue the prepaid payment card with the requested amount of funds loaded thereon.

Upon receiving the content message, the safebox access computing device provides the requested content items to the user. Continuing with the above example, the safebox access computing device may be communicatively coupled to a printer, allowing the safebox access computing device to print one or more items represented by the selected content items, such as the user-selected voucher. Furthermore, the safebox access computing device may have the physical capability to issue the prepaid payment card to the user.

The safebox system computing device may be integral and/or communicatively coupled to a financial institution, e.g., an issuer of the payment account from which funds are withdrawn from the virtual safebox. When the user accesses payment credentials stored within their virtual safebox to remotely withdraw funds (specifically without having their physical payment device present), the safebox access computing device may transmit a receipt message to the safebox system computing device. The receipt message includes the amount of the funds withdrawn by the user. The safebox system computing device transmits the receipt message to the issuer, and the issuer deducts the funds in the withdrawn amount from the payment account of the user. Notably, where the payment account is a credit account, the funds may be withdrawn as a cash advance, and the issuer may deduct the funds in the withdrawn amount from an available credit line. In other example embodiments, the issuer receives the receipt message directly from the safebox access computing device. For example, the user may withdrawal funds in the amount of $500.00 from the payment account identified by the payment credentials stored in their virtual safebox, and the safebox access computing device may transmit the receipt message directly to the issuer. The issuer may decrease the available funds or the credit limit of the payment account associated with the user by $500.00. In some example embodiments, the user may have previously selected a maximum withdrawal amount that is assigned to the payment credentials stored in the virtual safebox. For example, the user may have selected a withdrawal limit of $500.00. Accordingly, the user may only be able to request a prepaid payment card in an amount of $500.00.

The safebox system computing device may store the receipt message and update digital/virtual content stored in the virtual safebox based on withdrawn items. For example, if a user withdraws a cell phone voucher, the safebox system computing device updates the contents of the virtual safebox by removing the cell phone voucher therefrom. In some cases, withdrawal of digital/virtual content does not require the safebox system computing device to update digital/virtual content of a virtual safebox. For example, if a user withdraws a digital copy of an identification document (e.g., a copy of a driver's license), and subsequently the digital copy of an identification document is printed for the user by the safebox access computing device, the digital copy of an identification document is still stored within the virtual safebox. The safebox system computing device may generate and store a receipt record identifying the content retrieved and a date/time of retrieval, for example, for record-keeping purposes.

In some example embodiments, the safebox access computing device may present optional digital/virtual content to the user. For example, the user may have previously selected and/or stored more than one withdrawal amount associated with their payment account, and the safebox access computing device may display each of the available withdrawal amounts. Accordingly, the user may select at least one of the withdrawal amounts when the user is withdrawing funds from the associated payment account.

Individual safebox access computing devices may have alternative and/or additional capabilities, compared with other safebox access computing devices in the distributed network. Each safebox access computing device included in the distributed network may have one or more identifying parameters that indicate, for example, their location and capabilities. The safebox system computing device stores identifying parameters associated with each safebox access computing device within a memory and/or a database (e.g., the virtual vault database). For example, one safebox access computing device associated with a business (e.g., a bank) may have the capability to issue payment cards (e.g., prepaid cards and/or replacement/reissue payment cards) while, in contrast, an alternative safebox access computing device at a public kiosk may, in some cases, be only be able to provide cash to a user. The safebox system computing device may access and/or monitor each safebox access computing device to determine whether a specific safebox access computing device is capable of providing a requested function and/or if the safebox access computing device (or the safebox station at which the safebox access computing device is located) is capable of providing user-selected content items for withdrawal.

For example, in some embodiments, the safebox system computing device receives a content retrieval message including user-selected items for withdrawal, and further including an identifier of the particular safebox access computing device from which the content retrieval message is sent. The safebox system computing device performs a lookup using the identifier of the particular safebox access computing device to retrieve the identifying parameters for the safebox access computing device. The safebox system computing device may process the identifying parameters to determine whether the capabilities of the safebox access computing device are suitable to provide all user-selected content items identified in the content retrieval message. If not, the safebox system computing device may determine alternative safebox access computing devices with alternative and/or additional capabilities. For example, the safebox system computing device uses the location of the (initial) safebox access computing device to identify nearby alternative safebox access computing devices, and determines, from the identifying parameters of those alternative safebox access computing devices, which alternative device(s) have the necessary capabilities. The safebox system computing device may then transmit a recommendation message to the safebox access computing device. The recommendation message includes instructions that cause the (initial) safebox access computing device to recommend an alternative safebox access computing device with different capabilities to a user. The recommendation message may include a geographic location of and/or directions to the alternative safebox access computing device.

Additionally or alternatively, the safebox system computing device may transmit one more messages to the safebox access computing device including instructions that cause the safebox access computing device to display the capabilities of that safebox access computing device to a user thereof. In such embodiments, the user may recognize, before requesting content items, whether that safebox access computing device is capable of providing all content items the user wishes to access or withdraw.

In some example embodiments, safebox access computing devices may be communicatively coupled to other safebox access computing devices and/or other computing devices, such as vendor computing devices (e.g., for transmitting and/or receiving messages). In some embodiments, when a safebox access computing device does not have the capability to provide a selected content item to a user, the safebox access computing device may transmit content items and/or other messages to another safebox access computing device (e.g., an alternative safebox access computing device, as identified by the safebox system computing device) that is capable of providing the content items to the user. In some examples, a safebox access computing device may also transmit login credentials, including a user identifier and/or user identifying credentials, to the alternative safebox access computing device to facilitate expediting the authentication process, when the user must travel to the alternative safebox access computing device to withdraw/retrieve their items.

The safebox system may also include a plurality of participating vendors, which may register and/or enroll with the safebox system during a registration phase. During the registration phase, the participating vendors issue vouchers and/or coupons to be used with the safebox system. The vouchers may have various parameters defining how the vouchers can be used, such as for particular items, with a particular value (e.g., valued at $5 or for a discount of 10%), at one or more locations, and the like. Registered participating vendors are authorized, by the safebox system, to have these vouchers presented for selection to users when the users access their virtual safebox. The users may select one or more vouchers (which may be printed or digital, where the user has their personal computing device) and redeem the one or more vouchers at the participating merchants. The safebox system may provide the user with a list of participating vendors and associated vouchers, allowing the user to select vouchers to be stored within the virtual safebox of the user. The user may withdraw vouchers from their virtual safebox using a safebox access computing device and then redeem the voucher at a participating vendor in exchange for items and/or services.

In some cases, where a user pre-selects vouchers for storage in their virtual safebox, the user may pre-pay for the item(s) offered in the voucher. For example, if a user is concerned about losing their phone, the user may select a phone voucher for storage in their virtual safebox during a registration phase. During that registration phase, the user may also pre-pay some value associated with the phone voucher (e.g., $500, $1000, etc.) or may pre-pay a "down payment", representing a portion of the value of the item offered by the voucher. Alternatively, the user voucher may be associated with the payment account for which payment credentials are stored in the virtual safebox. When the voucher is provided to the user, the voucher includes some identifier of the payment account (e.g., embedded in a QR code), such that when the voucher is redeemed, a transaction using those payment credentials is initiated. For example, when a user takes the phone voucher to the participating vendor (e.g., their mobile carrier), the user redeems the voucher and the participating vendor sells them the phone using the voucher as a payment device to initiate the transaction using the stored payment credentials from the virtual safebox.

In some example embodiments, participating vendors may include financial institutions, hotels, merchants, car rental businesses, telephone companies (e.g., mobile carriers), pharmacies, or alternative and/or additional retailers and merchants. Vouchers and/or coupons may include a travel voucher, a hotel voucher, a food voucher, and/or a cellular phone voucher, etc. For example, a person may redeem a travel voucher with a participating vendor, for a taxi, shuttle, and/or ride-sharing service. In some example embodiments, vouchers may include a QR code, a prepaid card, a ticket, and/or a code (e.g., bar code) that may be presented at a participating vendor in exchange for one or more items. In some example embodiments, participating vendors may also act as a designated safebox station with one or more safebox access computing devices thereat.

In some cases, the safebox system computing device may generate vouchers that include any number of data elements that a merchant may require in order to process the voucher. For instance, a voucher may be printed with text or a QR code/barcode that includes user information, such as payment credentials, insurance information, name/address/etc., and the like. Accordingly, the voucher may be presented to the participating vendor without payment/identification credentials, as the voucher itself represents that the safebox system has already verified and approved provision of those credentials. In one particular example, a voucher for a replacement mobile phone may include a barcode/QR code that includes embedded therein sufficient user information (e.g., a user ID, password, mobile phone, account credentials, etc.) that causes the participating vendor (e.g., mobile phone vendor/carrier) to sync the replacement mobile phone with at least a portion of the data stored on the lost phone (e.g., contacts, photos, apps, emails, etc.).

To illustrate the safebox system in further detail, an example is provided. A user, while traveling in an unfamiliar city, has lost their luggage, in which the user had placed their wallet, passport, cellular phone, and medications. Luckily, the savvy user had the foresight to previously enroll in the safebox system of the present disclosure, by providing the safebox system with identification credentials and virtual content to be stored within their virtual safebox. The user selected for storage a prescription record, a passport record (including image content, specifically a copy of their passport), payment credentials associated with a payment account of the user, and a voucher for a prepaid cellular phone.

In this example, despite having lost their personal belongings, the user may walk to a nearby designated safebox station and provide the safebox access computing device thereat with their user identifier (which may be a telephone number or email address) and one or more identification credentials. The safebox access computing device transmits the user identifier and the identification credentials to the system computing device for authentication, as described above. Upon authentication of the user, the safebox system computing device authorizes the safebox access computing device to provide the user with an inventory list of their available stored content items, as described above. The user requests to withdraw the phone voucher, the prescription record, the passport record, and a prepaid payment card including funds from their payment account. The safebox access computing device prints the phone voucher, the passport record, and the prescription record and issues a prepaid payment card for the user. Next, the user redeems the phone voucher at a participating vendor (e.g., a telephone company) in exchange for a phone (for which the user has already paid or for which a transaction is then initiated). Furthermore, the user uses the prepaid payment card to arrange transportation to a local pharmacy, where the user provides their prescription record to obtain replacement medication.

In some cases, a user may be unaware of participating vendors in in an unfamiliar geographic region and as such, the user may have not previously selected or stored a voucher that can be redeemed at participating vendors in the geographic region near a specific safebox station. In some example embodiments, the safebox system computing device may offer one or more content items, such as vouchers, not previously stored in the virtual safebox by the user. The safebox system computing device may use the geographic location of the safebox access computing device that the user is currently accessing to locate near-by participating vendors and offer vouchers that can be redeemed thereat. In other words, the safebox system computing device may suggest or recommend one or more vouchers and/or coupons for participating vendors that are near the geographic location of the safebox access computing device and, therefore, near the user. For example, the safebox access computing device may be located in or proximate to a hotel or may be otherwise supported by (e.g., sponsored and/or maintained by) a hotel. The safebox access computing device may offer the user a voucher for hotel accommodations with the hotel. Additionally or alternatively, the safebox access computing device may offer a voucher for a restaurant near the user's current location. Accordingly, the safebox access computing device may provide and/or recommend vouchers to the user such that the user may quickly and easily redeem vouchers at nearby participating vendors.

In some embodiments, a user may store a generic voucher that may be redeemed for an item and/or service at an unspecified vendor. Upon receiving a request for withdrawal of the generic voucher, the safebox system computing device may use the geographic location of the safebox access computing device, from which the request was received, to locate a participating vendor that has the capability to redeem the generic voucher for the item and/or service. In some embodiments, the safebox system computing device may transmit a map and/or directions to the participating vendor(s), and the safebox access computing device may print and/or display the directions to the user.

In some example embodiments, the safebox system computing device and/or the safebox access computing device may be communicatively coupled to a vendor computing device associated with a participating vendor, such that the safebox system may transmit and receive messages with the participating vendor via the vendor computing device. For example, in some cases, a participating vendor may include a pharmacy, and the safebox system computing device and/or the safebox access computing device, at which a user requests withdrawal of a stored prescription record from their virtual safebox, may transmit the prescription record to the vendor computing device of the pharmacy on behalf of the user. In some embodiments, the safebox access computing device may transmit a voucher directly to a participating vendor, without printing the voucher. As such, the user may pick up the voucher and/or the items(s) associated therewith at the participating vendor.

In some embodiments, the safebox system computing device may be configured to communicate with one or more user computing devices, e.g., telephones. For example, the user may have stored in their virtual safebox contact information associated with one or more contacts that the user has requested to be contacted in case of emergency. The safebox system computing device may transmit one or more messages (e.g., emails, telephone calls, text messages, push notifications, etc.) to the user computing device(s) identified by the contact information. The messages indicate that the user has an emergency, and may include the current location or the user, based on the location of the safebox access computing device that the user is accessing, on behalf of the user.

At least one technical problem to be solved by the systems and methods provided herein includes: (i) the inability to access funds when a user does not have physical access to payment cards (or other payment devices) and/or their personal identification, (ii) the inability to obtain a mobile telephone without a payment method and/or a personal identification being physically present or accessible, and (iii) the inability to remotely access replacement personal items when payment devices, mobile phones, and/or personal identification(s) are physically present or accessible.

The technical effect of the systems and processes described herein may achieved by performing at least one of the following steps: (i) storing a plurality of virtual safeboxes associated with a respective plurality of users, each virtual safebox having a user identifier identifying the user that is a registered owner of the virtual safebox, each virtual safebox storing content provided by the respective user during a registration process, wherein the content includes image content representing personal identification documents of the respective user, and wherein the content is accessible via the distributed network of safebox access computing devices, (ii) receiving an access request message from a first safebox access computing device of the distributed network of safebox access computing devices, the access request message including a first user identifier of a first user of the first safebox access computing device, the first user identifier associated with a first virtual safebox stored in the virtual vault database, (iii) in response to receiving the access request message, retrieving, from the virtual vault database, the first virtual safebox by performing a lookup operation using the first user identifier, (iv) transmitting an inventory message to the first safebox access computing device, the inventory message including an inventory list identifying each content item of the content stored in the first virtual safebox and instructions that cause the first safebox access computing device to display the inventory list on a display of the first safebox access computing device, (vi) receiving a content retrieval message from the first safebox access computing device, the content retrieval message including a request to retrieve a user-selected first content item, included in the inventory list, from the content stored in the first virtual safebox, and (vii) transmitting a content message to the first safebox access computing device, the content message including the requested first content item A technical effect or improvement provided by the systems and processes described herein include at least one of: (i) providing a user access to digital/virtual content stored in a virtual safebox via any one of a distributed network of safebox access computing devices without requiring a physical or present payment device, mobile phone, and/or personal identification, (ii) providing a user access to a prepaid payment card issued to the user using stored payment credentials, (iii) providing a user one or more vouchers that may be exchanged at a participating vendor without requiring a physical or present payment device, mobile phone, and/or personal identification.

As used herein, a processor may include any programmable system including systems using micro-controllers, reduced instruction set circuits (RISC), application specific integrated circuits (ASICs), logic circuits, and any other circuits or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and thus are not limiting as to the types of memory usable for saving of a computer.

In one embodiment, a computer program is provided, and the program is embodied on a computer readable medium. In an example embodiment, the data optimization system is executed on a single computer system, without requiring a connection to a server computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, a card that is part of a digital wallet, and/or any other device that may hold payment account information, such as mobile phones, smartphones, personal digital assistants (PDAs), key fobs, and/or computers. Each type of transaction card can be used as a method of payment for performing a transaction. As used herein, the term "payment account" is used generally to refer to the underlying account associated with the transaction card.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a simplified schematic diagram of an example virtual safebox system 100 including a safebox system computing device 102 for enabling remote access to digital and/or virtual content stored in a virtual safebox 104, which is stored in a virtual vault database 106, via a distributed network of safebox access computing devices 108 in accordance with the present disclosure. Safebox system computing device 102 is communicatively coupled to virtual vault database 106 and stores content in and/or retrieves content from virtual safeboxes 104 within virtual vault database 106. Virtual vault database 106 may be a centralized or distributed database that stores a plurality of virtual safeboxes 104, each associated with a respective user.

A user 110 may register and/or enroll with safebox system 100 during a registration phase by providing various identification information that can be used to authenticate user 110 when user 110 does not have access to physical personal identification and attempts to access their virtual safebox 104. During registration, user 110 also provides and/or selects content 105 they wish to store in virtual safebox 104. User 110 may communicate their information to safebox system computing device 102 by transmitting one or more messages from their user computing device (not shown), such as a smartphone, laptop computer, desktop computing, tablet, and the like. Additionally or alternatively, user 110 may communicate with safebox system computing device 102 via one or more safebox access computing devices 108. User 110 may provide a user identifier, one or more identification credentials, payment card or payment account information, copies of personal identification, and/or additional and/or alternative information and/or data associated with user during the registration phase. The user identifier uniquely identifies user 110. In some embodiments, safebox system computing device 102 assigns a user identifier to user 110. In other embodiments, the user identifier is provided by the user and includes an identifier that can easily be remembered by user 110, such as a telephone number.

Identification credentials may include data elements used to authenticate user 110 when user 110 interacts with safebox access computing device(s) 108 and/or requests digital/virtual content 105 to be withdrawn from their virtual safebox 104. The identification credentials may include one or more biometric identifiers (e.g., finger prints, content for facial recognition, content for retinal scanning, and the like), a password, a personal identification number (PIN), and/or other codes or data that uniquely identify the user. Safebox system computing device 102 stores the identification credentials in virtual safebox 104 for accessing during an authentication process. The identification credentials (and/or any other digital/virtual content 105) may be encrypted before storage, to prevent unauthorized access thereof.

Upon registration, safebox system computing device 102 creates virtual safebox 104 having the user identifier assigned thereto, for storage of the identification credentials and other digital/virtual content 105 in the virtual safebox 104 that is registered to user 110. Safebox system computing device 102 may index digital/virtual content 105 according to the user identifier such that all digital/virtual content 105 associated with user 110 may be quickly and easily retrieved by safebox system computing device 102 using the user identifier.

In some embodiments, digital/virtual content 105 selected and/or provided by user 110 may include one or more of vouchers, payment credentials, and/or records. The vouchers may be redeemable at one or more participating vendors 111 for content items associated with digital/virtual content 105 stored in virtual safebox 104. Records may include copies or virtual representations of one or more documents, for example, personal identification documents, contact information, and/or medical and/or prescription documentation. The payment credentials are associated with a payment account of user 110. Funds may be withdrawn from the payment account in the form of at least one of cash or a prepaid card. In some example embodiments, user 110 may have previously selected a credit limit for funds to be withdrawn at a safebox access computing device 108, such that only funds below the credit limit may be withdrawn. In some embodiments, safebox system computing device 102 may also store additional or alternative digital/virtual content 105 selected and/or provided by user 110. In some embodiments, digital/virtual content 105 includes content not specifically provided by user 110 but accessible to user 110 within virtual safebox 104. For example, digital/virtual content 105 may include one or more recommended vouchers that may be redeemed at one or more participating vendors 111. Furthermore, user 110 may provide data (e.g., digital/virtual content 105) for storage in the virtual safebox 104 at any time, and the above-described processes are not limited to a single, one-time registration phase.

In some example embodiments, safebox system computing device 102 may be integral with and/or communicatively coupled to one or more payment processors of a payment processing network (not shown). The payment processing network includes set of proprietary communications standard for the exchange of financial transaction data and the settlement of funds between financial institutions. In some embodiments, the payment processing network is configured to receive and/or process messages from safebox access computing devices 108. As used herein, "payment processing network" refers broadly to the network and/or to one or more computing devices associated therewith (e.g., payment processors or payment processing computing devices).

In some other embodiments, safebox system computing device 102 may be integral with and/or communicatively coupled to one or more issuer processors of a financial institution (not shown). The financial institution may include an issuer of the user's payment account.

Safebox system computing device 102 is communicatively coupled to each safebox access computing device 108 of the distributed network. Additionally, one or more safebox access computing device(s) 108 may be communicatively coupled to other safebox access computing device(s) 108. Safebox system computing device 102 is configured to receive messages from and transmit messages to safebox access computing devices 108, and user 110 may communicate with safebox system computing device 102 using any safebox access computing device 108. User 110 may initiate one or more functions of safebox system 100, such as selecting items of digital/virtual content 105 to be withdrawn from their virtual safebox 104, using safebox access computing device 108. Safebox access computing device 108 may include a user interface (e.g., media output and/or user input device) such as a display screen, a touch screen, keyboard, fingerprint scanner, camera, and the like. Safebox system computing device 102 may transmits one or more messages to safebox access computing device 108, including instructions that cause safebox access computing device 108 to render one or more user displays (e.g., user display 200, shown in FIG. 2) to user 110 on a screen of safebox access computing device 108. The user displays convey information to user 110 and/or provide one or more controls that may be selected by user 110 initiate an authentication process, request an inventory of digital/virtual content 105 in the virtual safebox, and/or select digital/virtual content 105 to be withdrawn from virtual safebox 104.

Each safebox access computing device 108 may be located at a designated safebox station 112. Safebox station 112 may include an ATM, a kiosk, a participating hotel, business, and/or a participating financial institution. Each safebox access computing device 108 has various capabilities that are dependent on the physical hardware thereof and/or at designated safebox station 112. For example, at least some safebox access computing devices 108 include or are communicatively coupled to a printer, allowing the safebox access computing device 108 to print one or more items, such as vouchers, prepaid payment card information, and/or copies of records retrieved from virtual safebox 104 for user 110. As another example, at least some safebox access computing devices 108 are capable of issuing a prepaid payment card to user 110.

Safebox system computing device 102 may store information regarding the capabilities and locations of each individual safebox access computing device 108 in the distributed network. In some example embodiments, safebox system computing device 102 may transmit a capability message to safebox access computing device 108. The capability message includes instructions which cause safebox access computing device 108 to display the capabilities of safebox access computing device 108 to user 110. In some example embodiments, the instructions may cause safebox access computing device 108 to display the location and/or capabilities of other safebox access computing devices 108. At some designated stations, a teller or an employee may interact with safebox access computing device 108 on behalf of user 110.

As illustrated in FIG. 1, user 110 may access digital/virtual content 105 stored in virtual safebox 104 having a user identifier that user 110 inputs at a safebox access computing device 108. Specifically, user 110 may provide user information 113 to safebox access computing device 108 to initiate authentication of user 110 prior to user 110 being granted access to digital/virtual content 105. User information 113 may include a user identifier and one or more identification credentials. User 110 may input identification credentials, such as a personal identification number (PIN), some other alphanumeric code, username and/or password, a biometric parameter (e.g., finger print or facial recognition), and the like.

Safebox access computing device 108 transmits an authentication request message 114, including user information 113, to safebox system computing device 102. Safebox system computing device 102, upon receiving authentication request message 114, performs an authentication process by using the user identifier to identify virtual safebox 104 in virtual vault database 106 (and/or retrieve digital/virtual content 105 therefrom), because the identified virtual safebox 104 includes the same user identifier that was included in authentication request message 114. Safebox system computing device 102 determines whether the identification credentials, included in authentication request message 114, match the identification credentials stored in virtual safebox 104.

In some embodiments, during the authentication process, safebox system computing device 102 may transmit one or more security inquiries back to safebox access computing device 108. For example, the security inquiries may cause safebox access computing device 108 to prompt user 110 provide additional identification credentials or other responses to the one or more security inquiries. Answers to these security inquires may have been previously provided by user 110 (e.g., during the registration phase) and stored within virtual safebox 104 by the safebox system computing device 102. Safebox access computing device 108 may transmit the responses input by user 110 to safebox system computing device 102, and safebox system computing device 102 may compared stored inquiry answers to the received inquiry answers to complete the authentication process.

Upon performing the authentication process, safebox system computing device 102 transmits an authentication response message 116 to safebox access computing device 108. When the received and stored identification credentials match (and/or when responses to security inquiries are confirmed), safebox system computing device 102 transmits authentication response message 116 that includes a confirmation and/or an authorization that authorizes safebox access computing device 108 to provide user 110 with digital/virtual content 105 contained in virtual safebox 104. When the identification credentials did not match, safebox system computing device 102 may transmit authorization response message 116 that includes a negative response (e.g., an access decline).

In some embodiments, authentication request message 114 also includes an authorization request that requests the safebox system computing device 102 to authorize safebox access computing device 108 to provide user 110 with one or more content items from virtual safebox 104. In such embodiments, authentication response message 116 may include an inventory list including a description of digital/virtual content 105 currently contained within virtual safebox 104 registered to user 110.

In other embodiments, after the authentication process is completed and user 110 is successfully authenticated, safebox access computing device 108 transmits a separate request message that requests the inventory list of digital/virtual content 105. For example, user 110 initiates an inventory request process using safebox access computing device 108. The inventory request process includes user 110 requesting an inventory of the current digital/virtual content 105 stored within virtual safebox 104 registered to user 110. Upon such request from user 110, safebox access computing device 108 transmits an inventory request message (not shown) to safebox system computing device 102. The inventory request message includes a request to provide a current inventory of digital/virtual content 105 stored in virtual safebox 104, and may further include the user identifier and/or one or more identification credentials (e.g., two identification credentials, such as a two-factor authentication procedure). In response to receiving the inventory request message, safebox system computing device 102 performs a lookup operation to identify virtual safebox 104 having the user identifier, generates the inventory list of digital/virtual content 105, and transmits an inventory response message (separate from authentication response message 116) to safebox access computing device 108.

Upon completion of authentication process, safebox access computing device 108 displays the inventory list including a description of digital/virtual content 105 contained within virtual safebox 104 associated with (e.g., registered to) user 110. User 110 initiates a withdrawal process, which may include funds withdrawal and/or document print-out, by selecting one or more items of digital/virtual content 105 from the inventory list. In some embodiments, user 110 selects digital/virtual content 105 to be withdrawn from virtual safebox 104 using a user interface of safebox access computing device 108. In other embodiments, user 110 may interact with a teller, who in turn uses safebox access computing device 108 to select digital/virtual content 105 to be withdrawn from virtual safebox 104 on behalf of user 110.

Safebox access computing device 108 transmits a withdrawal message 118 to safebox system computing device 102. Withdrawal message 118 includes a list of the items of digital/virtual content 105 selected by user 110 to be withdrawn from virtual safebox 104. Upon receiving withdrawal message 118, safebox system computing device 102 retrieves the selected items from virtual safebox 104. Safebox system computing device 102 generates an item provision message 120, which includes the selected digital/virtual content 105 and/or data associated therewith. Item provision message 120 also includes instructions for safebox access computing device 108 to provide the selected digital/virtual content 105 to the user 110 (e.g., by printing, displaying, issuing as a prepaid card or card, and the like). Safebox system computing device 102 transmits item provision message 120 back to safebox access computing device 108. During the withdrawal process, safebox access computing device 108 may transmit and receive any number of withdrawal and/or item provisions messages with safebox system computing device 102.

Safebox access computing device 108 provides one or more items 122 to user 110 based on the data and instructions contained in item provision message 120. Items 122 include the particular items of digital/virtual content 105 that user 110 selected and requested to be withdrawn from virtual safebox 104 during the withdrawal process.

To provide items 122 to user 110, safebox access computing device 108 may leverage its physical hardware and capabilities. For example, safebox access computing device 108 may include and/or be communicatively coupled to prepaid card issuing hardware (e.g., an embosser, a printer, a device to manipulate data stored in a magnetic stripe, etc.). Therefore, safebox access computing device 108 may provide a prepaid payment card 126 issued to user 110. Additionally or alternatively, safebox access computing device 108 may include and/or be communicatively coupled to an ATM or other cash-provision hardware, and may provide cash to user 110.

As another example, safebox access computing device 108 may include and/or be communicatively coupled to a printer. Therefore, safebox access computing device 108 may provide or print certain items 122 for user 110, such as a voucher 124 that may be redeemed at a participating vendor 111, a copy of a personal identification credential, directions to one or more locations (e.g., a participating vendor 111, a bank, another safebox access computing device 108, etc.), and the like. In some specific examples, voucher 124 includes a phone voucher that may be redeemed a participating vendor including a telephone company in exchange for a prepaid mobile phone 130.

In some embodiments, user 110 may have previously selected and stored vouchers 124 within their virtual safebox 104. Additionally or alternatively, vouchers 124 may be suggested to user 110 by safebox system computing device 102 based on the geographic location of designated station 112 at which user 110 initiated the withdrawal process. Suggested vouchers may be selected by the user 110 and are redeemable at participating vendors 111 that are in located in proximity to the designated station 112. As described herein, participating vendors 111 may have previously registered with safebox system 100 and may therefore be authorized to provide user 110 with one or more items represented by or associated with digital/virtual content 105 contained virtual safebox 104, such as by accepting one or more vouchers 124 presented by user 110.

Safebox access computing device 108 transmits a receipt message 132 to safebox system computing device 102. Receipt message 132 includes at least one receipt data element indicating that the user-selected items 122 were withdrawn by user 110. In response to receiving receipt message 132, safebox system computing device 102 stores an update record (not shown) in virtual safebox 104 within virtual vault database 106, including details of the withdrawal (e.g., what was withdrawn, the location and/or an identifier of safebox access computing device 108, a date/time of withdrawal, etc.). In some embodiments, the update record includes an amount of money withdrawn from the payment account for which payment credentials are stored as digital/virtual content 105. These update records may identify an amount to debit from the payment account or a deduction from an available credit balance.

As discussed above, safebox system computing device 102 may be communicatively coupled to and/or formed integrally with an issuer processor of an issuer of the user's payment account. Safebox system computing device 102 may communicate with the corresponding issuer processor of the payment account during the withdrawal process, such that the funds or credit balance is updated in real-time. Additionally or alternatively, safebox system computing device 102 may clear and settle cash/debit prepayments with one or more issuers periodically (e.g., once a day, once a week, etc.). The issuer processor may remove funds and/or deduct a value from a credit balance of user 110 in the amount that was withdrawn from virtual safebox 104 at safebox access computing device 108 by user 110.

In some cases, such as where the selected digital/virtual content 105 is one or more vouchers, safebox system computing device 102 removes one or more items of digital/virtual content 105, as indicated in receipt message 132, from virtual safebox 104.

Figure 2:
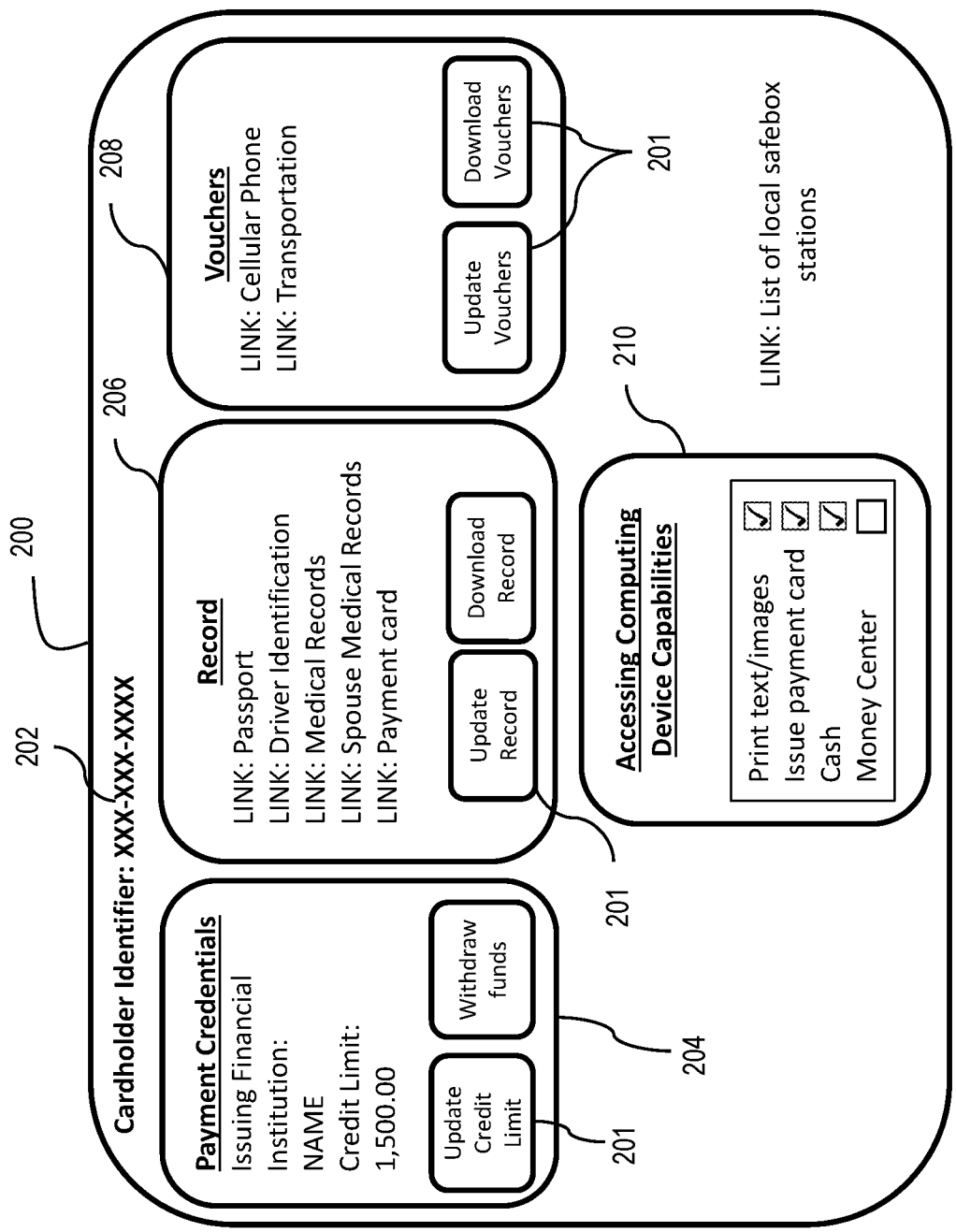

FIG. 2 illustrates an example display screen 200 that may be displayed by a safebox access computing device (e.g., safebox access computing device 108) of a safebox system (e.g., safebox system 100, both shown in FIG. 1). Safebox access computing device is communicatively coupled to a safebox system computing device (e.g., safebox system computing device 102, also shown in FIG. 1). Safebox system computing device 102 transmits various messages to safebox access computing device 108, which include instructions that cause safebox access computing device 108 to display information to a user (e.g., user 110, also shown in FIG. 1), such as via display screen 200.

Display screen 200 displays, to user 110 (and/or an employee or teller), data associated with digital/virtual content (e.g., digital/virtual content 105) of a virtual safebox (e.g., virtual safebox 104, both shown in FIG. 1) that is registered to user 110. Display screen 200 provides one or more controls 201 to user 110. User 110 may select one or more controls 201 in order to initiate various processes, as described herein, including uploading digital/virtual content 105 to be stored within virtual safebox 104, requesting an inventory list of digital/virtual content 105, and/or selecting items of digital/virtual content 105 for withdrawal. Controls 201 may be embodied as links, buttons, toggles, and the like, and are configured to be selected by user 110 to initiate or complete an operation with safebox system computing device 102 via safebox access computing device 108.

As described herein, user 110 may register and/or enroll with safebox system 100 by providing one or more identification credentials and digital/virtual content 105 to be stored within virtual safebox 104. In some embodiments, user 110 registers with safebox system 100 using one or more safebox access computing device 108 of the distributed network of safebox access computing devices 108. Additionally or alternatively, user 110 registers using their personal computing device (not shown).

Display screen 200 is provided to user 110 via a safebox access computing device 108, for example, when user 110 is without their payment device(s), mobile phone, personal identification document(s), and the like, as described herein.

In the example embodiment, display screen 200 is specifically provided in response to receiving an inventory list of digital/virtual content 105 from safebox system computing device 102. In the specific example shown in FIG. 2, display screen 200 displays a user identifier 202 and an inventory list of available (e.g., stored and/or otherwise accessible) digital/virtual content 105 including stored payment credentials 204, records 206, and vouchers 208.

Records 206 include a passport record, a driver identification record, a medical record, a medical record of a spouse, and a payment card record that were previously provided by user 110 and stored within virtual safebox 104. The payment card record may include an image of a payment card for which payment credentials are stored, or an alternative payment card. Display screen 200 includes a control 201 that allows user 110 to download one or more records 206 from virtual safebox 104, specifically, a "Download Record" button. After user 110 selects this button, one or more additional dialogue boxes may prompt user 110 to select one or more records 206 for withdrawal. Alternatively, display screen 200 may include controls 201 (e.g., selectable radio buttons) that enable user 110 to select their desired records 206 within a single screen. Once user 110 selects records 206 for withdrawal, safebox access computing device 108 provides (e.g., prints) those records 206 to user 110, as described herein.

Display screen 200 also displays stored payment card credentials 204, which were previously provided by user 110 and are associated with a payment account at the indicated issuing financial institution. Further, user 110 previously selected a credit limit of $1,500.00 such that user 110 may withdraw funds in the amount of $1,500.00 (or less, in some embodiments) from the associated payment account, via safebox access computing device 108. Display screen 200 includes a control 201 that allows user 110 to withdraw funds in an amount equal to or below the displayed credit limit, specifically, a "Withdraw funds" button. After user 110 selects this button, safebox access computing device 108 may issue the selected funds to user 110 (e.g., as a prepaid card and/or as cash). In some embodiments, depending on the capabilities of safebox access computing device 108, user 110 may withdraw a portion of the funds as cash and another portion of the funds as a prepaid card.

Display screen 200 also display a plurality of vouchers 208, which may have been previously selected and/or stored by the user 110 within the virtual safebox 104 and/or may have been selected by safebox system computing device 102, as described herein. In the illustrated embodiment, voucher 208, including a cellular phone voucher and a transportation voucher. Vouchers 208 may be redeemed at one or more participating vendors for content physical items representing digital/virtual content stored in the virtual safebox. The user may provide the cellular phone voucher to the participating vendor the in exchange for a prepaid cellular phone. The user 110 may withdraw one or more vouchers 208 the cellular phone voucher using a control 201 of including a "Download Vouchers" button. After the user 110 selects this button, the safebox station access computing device 108 may provide (e.g., prints) the selected voucher(s) 208 to user 110. Display screen 200 and/or the printed vouchers may indicate the participating vendor and/or the geographic location of the participating vendor.

Display screen 200 also displays the capabilities 210 of safebox access computing device 108. In the illustrated embodiments, this particular safebox access computing device 108 is capable of printing text and/or images and of providing funds as an issued prepaid card and/or cash. However, this safebox access computing device 108 is unable to provide funds in the form of a money order. Further, display screen 200 includes a control 201 including a link to a list of nearby safebox access computing devices 108 (e.g., having alternative capabilities), which may be selected by user 110. User 110 may select this link, and one or more additional dialogue boxes describing the location and capabilities of one or more alternative safebox access computing devices 108 may be displayed to user 110.

Display screen 200 also displays the user identifier, indicating user 110 (associated with that user identifier) is the registered owner of that virtual safebox 104. In some example embodiments, display screen 200 may also display and/or provide access to stored identification credentials and/or allow the user to adjust the identification credentials. In some embodiments, display screen 200 may also provide controls 201 that enable user 110 to update information stored in virtual safebox 104. For example, display screen 200 includes an "Upload Record" button that allows user 110 to upload one or more records to be stored within virtual safebox 104. As another example, display screen 200 includes an "Update Credit Limit" button that may be selected by user 110 to modify their stored credit limit. Safebox access computing device 108 may present additional or alternative user displays with additional or alternative information and/or dialogue boxes that may present additional or alternative information to the user 110.

Figure 3:
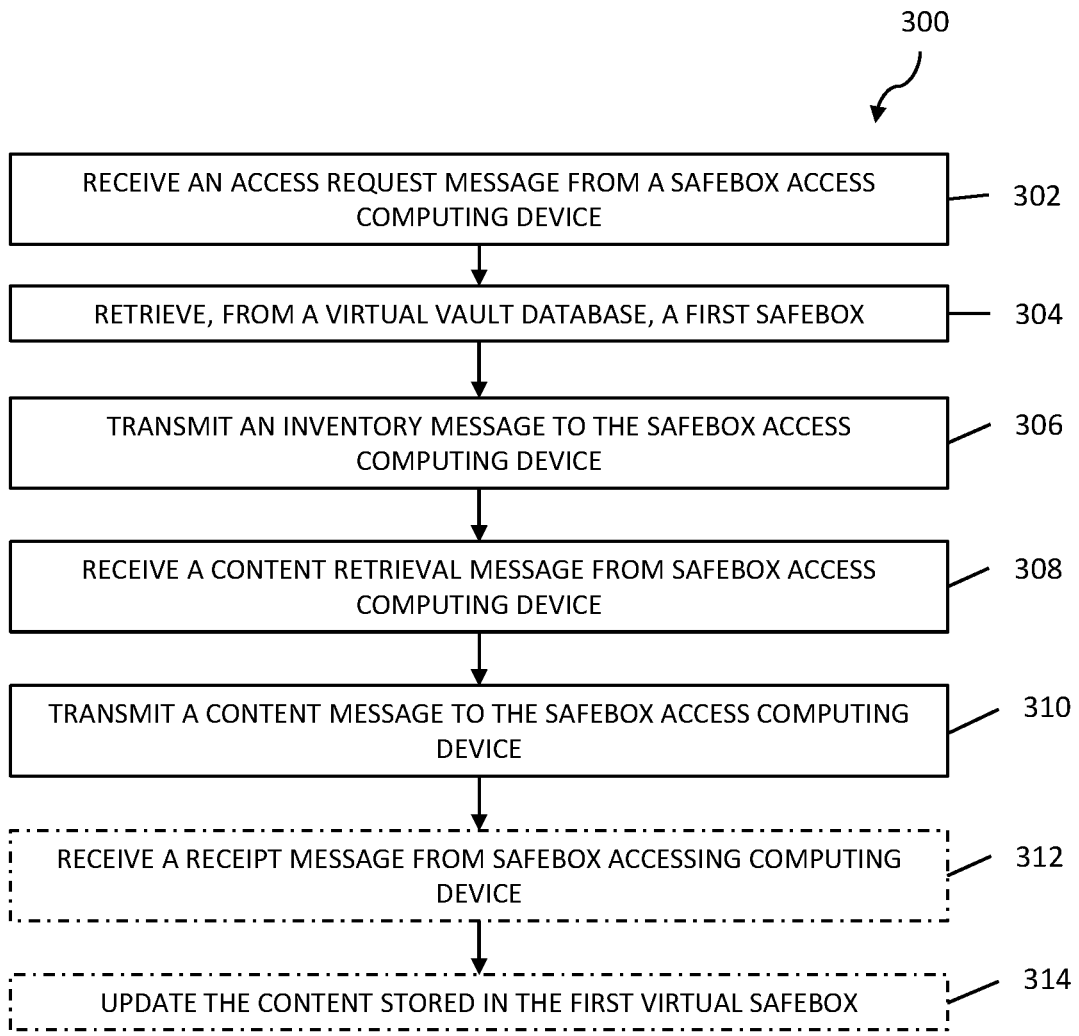

FIG. 3 is an example process flow diagram of a method 300 for providing for providing virtual and remote access to virtual content in a virtual safebox (e.g., virtual safebox 104) at a plurality of safebox stations (e.g., safebox stations 112, both shown in FIG. 1). Method 300 may be implemented, at least in part, by a safebox system computing device (e.g., safebox system computing device 102) and/or one or more safebox access computing devices (e.g., safebox access computing devices 108, also both shown in FIG. 1). The system computing device is communicatively coupled to a virtual vault database (e.g., virtual vault database 106, also shown in FIG. 1) and is configured to generate and store a plurality of the virtual safeboxes within the virtual vault database. The virtual vault database stores a plurality of virtual safeboxes associated with a respective plurality of users. Each virtual safebox has user identifier identifying the user that is a registered owner of the virtual safebox. In addition, each virtual safebox stores content provided by the respective user during a registration process. The virtual includes image content representing personal identification documents of the respective user.

The registration process may include a user selectively storing and/or removing content from the virtual safebox registered to the user and may not necessarily be associated with an enrollment process. Accordingly, the user may access, add, and/or remove content stored their virtual safebox at any time. A user may access the content stored in the virtual safebox using at least one safebox access computing device.

In this illustrated embodiment, method 300 includes receiving 302 an access request message from a safebox access computing device. The access request message includes a first user identifier of a first user. The first user identifier is associated with a first virtual safebox stored in the virtual vault database. For example, a user may access the content stored in their virtual safebox by providing the safebox access computing device with a user identifier and one or more identification credentials.

Method 300 further includes, in response to receiving the access request message, retrieving 304, from the virtual vault database, a first virtual safebox having the first user identifier. Retrieving 304 includes using the first user identifier, contained in the access request message, to perform a lookup operation to find a virtual safebox assigned to the user identifier within the virtual vault database.

Method 300 further includes transmitting 306 an inventory message to the safebox access computing device. The inventory message an inventory list identifying each content item of the content stored in the first virtual safebox and instructions that cause the safebox access computing device to display the inventory list on a display screen of the safebox access computing device.

Method 300 further includes receiving 308 a content retrieval message from the safebox access computing device. The content retrieval message includes a request to retrieve a user-selected first content item, included in the inventory list, from the content stored in the first virtual safebox. Method 300 also includes transmitting 310 a content message to the safebox access computing device. The virtual message includes the requested first content item.

Method 300 may include additional, alternative, and/or fewer steps. For example, in some embodiments, method 300 further includes receiving 312 a receipt message from the safebox access computing device, the receipt message including the user identifier and an indication of receipt of the first content item. In some embodiments, the content stored in the first virtual safebox also includes payment credentials associated with a payment account of the first user from which funds can be withdrawn and the first content item includes funds from the payment account. Method 300 may also include generating 314 a record of receipt of the first content item including at least one of an updated balance of the payment account or an updated credit limit of the payment account.

In some embodiments, method 300 further includes receiving an authentication request message from the safebox access computing device, the authentication message including the first user identifier and one or more input identification credentials provided by the user to the safebox access computing device. Method 300 may also include, in response to receiving the authentication request message, parsing the stored identification credentials from the first virtual safebox. Method 300 may also include comparing the input identification credentials and stored identification credentials to determine whether the input identification credentials match the stored identification credentials. Method 300 may also include, if the input identification credentials are the same as the stored identification credentials, transmitting an authentication response message to the safebox access computing device, the authentication response message including an indication that authentication of the first user was successful and the first user is authorized to view the inventory list.

In some example embodiments, method 300 includes determining that the first safebox access computing device does not have a capability to provide the first content item to the first user, identifying an alternative safebox access computing device of the distributed network of safebox access computing devices that has the capability to provide the first content item to the user, and transmitting a recommendation message to the safebox access computing device. The recommendation message includes a recommendation for an alternative safebox access computing device with alternative capabilities different from the capabilities of the safebox access computing device.

Figure 4:
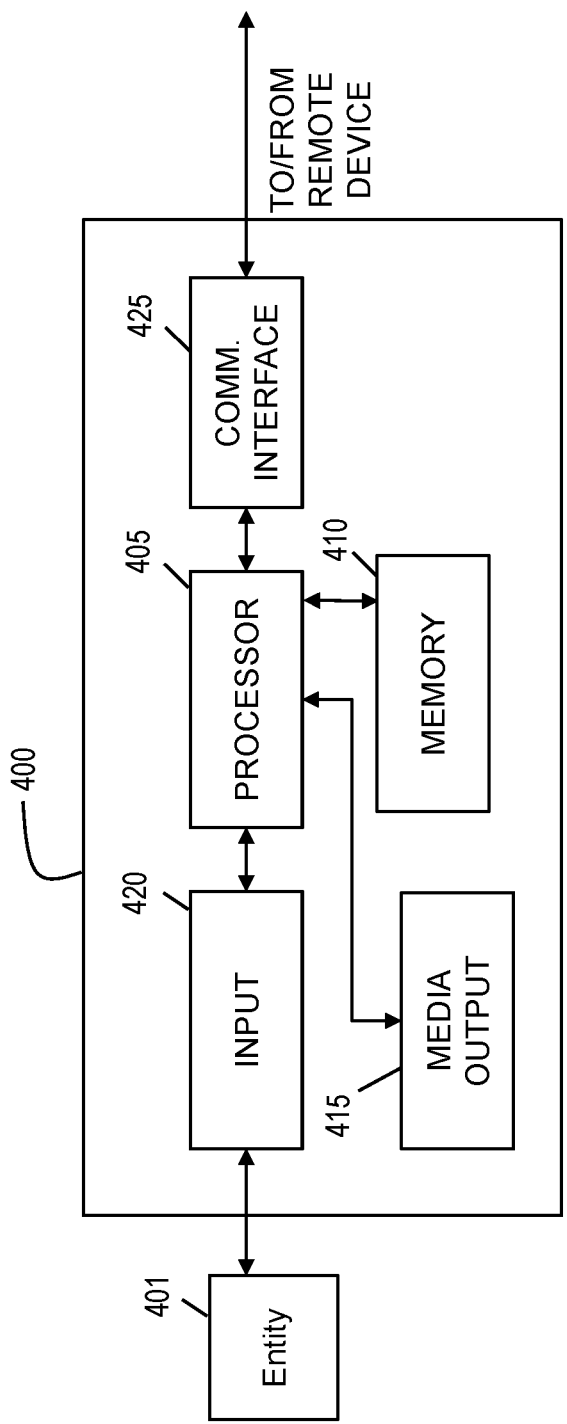

FIG. 4 illustrates an example configuration of an entity computing device 400, such as safebox access computing device 108, shown in FIG. 1. Entity computing device 400 may include a laptop, tablet, mobile phone, desktop computing device, ATM, kiosk, or other dedicated computing device associated with safebox system 100 (shown in FIG. 1). In the example embodiment, entity computing device 400 is operated by an entity 401 (e.g., user 110 shown in FIG. 1 or a teller at one of a plurality of safebox stations 112, also shown in FIG. 1).

Entity computing device 400 includes a processor 405 for executing instructions, and a memory 410. In some embodiments, executable instructions are stored in memory 410. Processor 405 may, for example, include one or more processing units (e.g., in a multi-core configuration). Memory 410 may, for example, be any one or more devices allowing information such as executable instructions or transaction data to be stored and retrieved. Memory 410 may further include one or more computer readable media.

In the example embodiment, entity computing device 400 further includes at least one media output component 415 for presenting information to entity 401. Media output component 415 may, for example, be any component capable of converting and conveying electronic information to entity 401. In some embodiments, media output component 415 includes an output adapter (not shown), such as a video adapter or an audio adapter, which is operatively coupled to processor 405 and operatively coupleable to an output device (also not shown), such as a display device (e.g., a cathode ray tube (CRT), liquid crystal display (LCD), light emitting diode (LED) display, or "electronic ink" display) or an audio output device (e.g., a speaker or headphones). Media output 415 may additionally include one or more hardware devices configured to provide physical content items to entity 401, such as a printer, a card issuer, a magnetic stripe reader/writer, and the like.

In some embodiments, media output component 415 is configured to include and present a graphical user interface such as a web browser or a client application, to entity 401. In some embodiments, entity computing device 400 includes an input device 420 for receiving input from entity 401. Entity 401 may use input device 420, without limitation, to select or enter one or more items to purchase or request to purchase, to access credential information, or to access payment information. Input device 420 may include, for example, a keyboard, a pointing device, a mouse, a stylus, a touch sensitive panel (e.g., a touch pad or a touch screen), a gyroscope, an accelerometer, a position detector, a biometric input device, or an audio input device. A single component such as a touch screen may function as both an output device of media output component 415 and input device 420.

Figure 5:
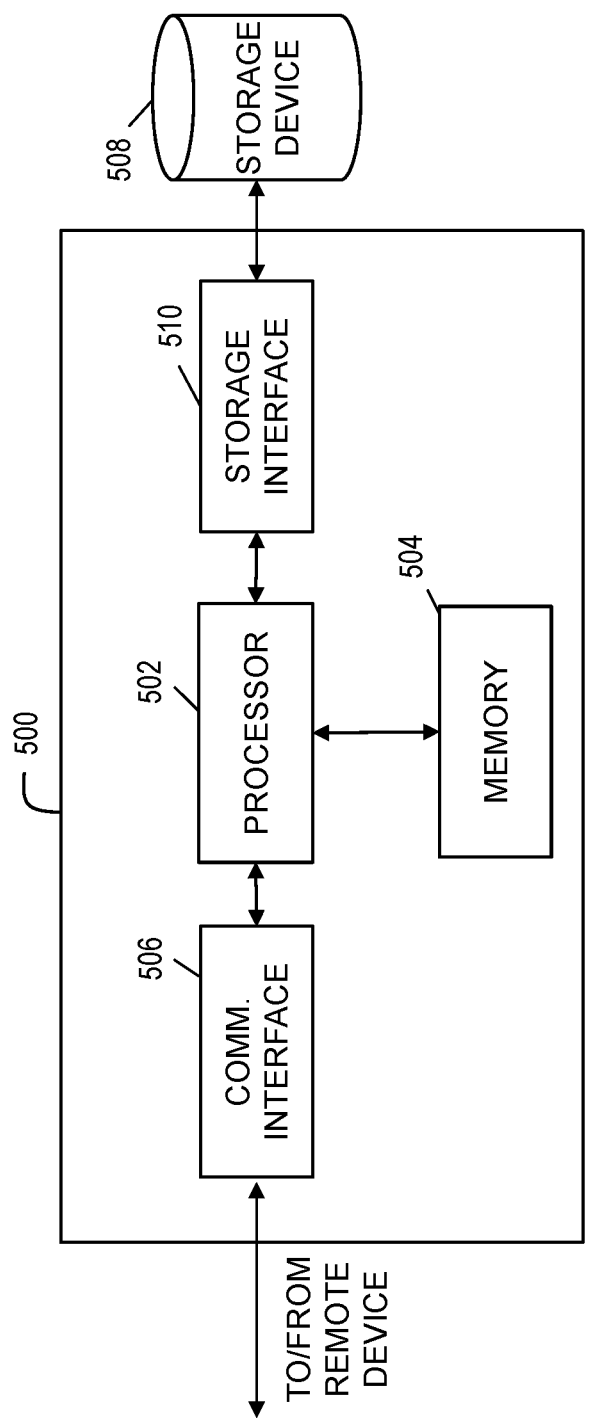

In one embodiment, entity computing device 400 further includes a communication interface 425, communicatively coupled to a remote device such as a server computing device 500 (shown in FIG. 5). Communication interface 425 may include, for example, a wired or wireless network adapter or a wireless data transceiver for use with a mobile telecommunications network.

In the example embodiment, memory 410 stores computer readable instructions for providing a user interface to entity 401 through media output component 415 and, optionally, for receiving and processing input from input device 420. A user interface may include, among other possibilities, a web browser or a client application. Web browsers enable users, such as entity 401, to display and interact with media and other information typically embedded on a web page or a website from server computing device 500. A client application allows entity 401 to interact with, for example, server computing device 500. For example, instructions may be stored by a cloud service, and the output of the execution of the instructions sent to the media output component 415. Processor 405 executes computer-executable instructions for implementing aspects of the disclosure. In some embodiments, the processor 405 is transformed into a special purpose microprocessor by executing computer-executable instructions or by otherwise being programmed.

FIG. 5 illustrates an example configuration of a server computing device 500, such as safebox system computing device 102, of safebox system 100 (shown in FIG. 1). Computing device 500 includes a processor 502 for executing instructions. Instructions may be stored to a memory 504. Processor 502 may include one or more processing units (e.g., in a multi-core configuration) for executing instructions. The instructions may be executed within a variety of different operating systems on data optimizing computing device, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 502 is operatively coupled to a communication interface 506 such that computing device 500 is capable of communication with remote devices. Processor 502 may also be operatively coupled to a storage device 508. For example, storage device 508 is used to implement virtual vault database 106. Storage device 508 is any computer-operated hardware suitable for storing and/or retrieving data. In some embodiments, storage device 508 is integrated in computing device 500. For example, computing device 500 may include one or more hard disk drives as storage device 508. In other embodiments, storage device 508 is external to computing device 500. For example, storage device 508 may include multiple storage units such as hard disks or solid state disks in a redundant array of inexpensive disks (RAID) configuration. Storage device 508 may include a storage area network (SAN) and/or a network attached storage (NAS) system.

In some embodiments, processor 502 is operatively coupled to storage device 508 via a storage interface 510. Storage interface 510 is any component capable of providing processor 502 with access to storage device 508. Storage interface 510 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 502 with access to storage device 508.

Memory 504 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect includes enabling remote access to a virtual safety deposit box without physical access to personal identification, payment devices, and/or personal computing devices. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A safebox computing system for providing remote access to content stored in a virtual safebox, the computer system comprising:
   a virtual vault database storing a plurality of virtual safeboxes associated with a respective plurality of users, each virtual safebox including content that is accessible using a user identifier identifying the user that is a registered owner of the virtual safebox, the content is selected by the respective user during a registration process, wherein the content includes i) image content representing personal identification documents associated with the respective user, ii) a payment account identifier, and iii) a user selected credit limit for funds that may be withdrawn by the user from the virtual vault database using the identified payment account;
   a distributed network of a plurality of designated safebox access computing devices enabling remote access to content selected by users and stored in the virtual safeboxes including access to withdraw at least a portion of the funds of the selected credit limit; and
   a computing device comprising at least one processor in communication with the virtual vault database and each of the plurality of safebox access computing devices of the distributed network of designated safebox access computing devices, the at least one processor programmed to:
      receive an access request message from a first safebox access computing device of the distributed network of designated safebox access computing devices, the access request message including a first user identifier of a first user of the first safebox access computing device, the first user identifier associated with a first virtual safebox stored in the virtual vault database;
      in response to receiving the access request message, retrieve, from the virtual vault database, content items contained within the first virtual safebox by performing a lookup operation using the first user identifier;
      determine if a content item is unavailable at the first safebox access computing device;
      in response to determining that at least one content item is unavailable at the first safebox access computing device, transmit a request message to one or more safebox access computing devices to identify an alternative safebox computing device from the plurality of designated safebox access computing devices that has the capability to provide the unavailable content item and a location of the alternative safebox computing device;
      transmit an inventory message to the first safebox access computing device, the inventory message including an inventory list identifying each content item of the content stored in the first virtual safebox and instructions that cause the first safebox access computing device to present the inventory list on a display of the first safebox access computing device and when one or more content items are unavailable at the first safebox access computing device, present on the display a location of the alternative safebox computing device at which the content items are available;
      receive a content retrieval message from the first safebox access computing device, the content retrieval message including a request to retrieve a user-selected first content item, included in the inventory list, from the content stored in the first virtual safebox including a user request to withdraw a physical payment card issued to the first user, the physical payment card including at least a portion of the funds of the selected credit limit of the first virtual safebox; and
      transmit a content message to the first safebox access computing device, the content message including the requested first content item including the portion of the funds of the selected credit limit, the content message prompting delivery of a physical payment card issued to the first user having the portion of the funds linked thereto.

2. The safebox computing system according to claim 1, wherein the processor is further programmed to:
   receive a receipt message from the first safebox access computing device, the receipt message including the first user identifier and an indication of receipt of the first content item; and
   store a record of the receipt of the first content item.

3. The safebox computing system according to claim 2, wherein the content stored in the first virtual safebox also includes payment credentials associated with a payment account of the first user from which funds can be withdrawn, wherein the first content item includes funds from the payment account, and wherein the processor is further programmed to:
   generate the record of receipt of the first content item including at least one of an updated balance of the payment account or an updated credit limit of the payment account.

4. The safebox computing system according to claim 1, wherein each virtual safebox further stores one or more identification credentials that uniquely identify the respective user and that were previously provided by the respective user to the computing device for storage in the virtual vault database.

5. The safebox computing system according to claim 4, wherein the processor is further programmed to:
   receive an authentication request message from the first safebox access computing device, the authentication message including the first user identifier and one or more input identification credentials provided by the first user to the first safebox access computing device;
   in response to receiving the authentication request message, parse the stored identification credentials from the first virtual safebox;
   compare the input identification credentials and stored identification credentials to determine whether the input identification credentials match the stored identification credentials; and
   when the input identification credentials match the stored identification credentials, transmit an authentication response message to the first safebox access computing device, the authentication response message including an indication that authentication of the first user was successful and the first user is authorized to view the inventory list.

6. The safebox computing system according to claim 1, wherein the virtual content further includes content including at least one voucher associated with an item and one or more preselected features, that is redeemable at a participating vendor, and wherein the processor is further programed to:

transmit the voucher to the participating vendor, wherein upon receiving the voucher the participating vendor provides the item including the one or more preselected features.

7. The safebox computing system according to claim 1, wherein the processor is further programmed to:
in response to determining that the first safebox access computing device does not have a capability to provide the first content item to the first user, determine a geographic location of the first safebox access computing device;
identify one or more alternative safebox access computing device of the distributed network of safebox access computing devices that has the capability to provide the first content item to the user;
compare the location of the first safebox to locations of the one or more alternative safebox access computing devices to determine the nearest alternative safebox; and
transmit a recommendation message to the first safebox access computing device, wherein the recommendation message includes an identification and location of the nearest alternative safebox access computing device and instructions for the first access computing device to provide the identification and a location of the nearest alternative safebox access computing device to the first user.

8. The safebox computing system according to claim 1, wherein the content stored in the first virtual safebox includes contact information including a cellular phone number, for a plurality of contacts of the first user, wherein the user-selected first content item includes a voucher for a replacement mobile phone to replace an existing mobile phone, and wherein the processor is further programmed to:
generate a printable version of the voucher that includes at least one of a QR code or a barcode embedded with an identifier of the existing mobile phone, wherein, when the at least one of the QR code or the barcode is processed by a participating mobile phone vendor, the at least one of the QR code or the barcode causes the mobile phone vendor to provide the replacement mobile phone including the contact information stored thereon; and
transmit the printable version of the voucher to the first safebox access computing device.

9. The safebox computing system according to claim 1, wherein the distributed network of designated safebox access computing devices are associated with a kiosk storing physical content, and wherein the processor is further programmed to:
responsive to receiving a content retrieval message, transmit a content message to the first safebox access computing device, the content message including the requested first content item including the portion of the funds of the selected credit limit, the content message causing the kiosk to deliver the physical payment card issued to the first user having the portion of the funds linked thereto.

10. The safebox computing system according to claim 1, wherein the distributed network of designated safebox access computing devices are associated with a kiosk storing physical content, and wherein the processor is further programmed to:

receive a content retrieval message from the first safebox access computing device, the content retrieval message including a request to retrieve a user-selected first content item, included in the inventory list, from the content stored in the first virtual safebox including image content representing personal identification documents; and
transmit a content message to the first safebox access computing device, the content message including the requested first content item, the content message causing the kiosk to print the requested image content representing personal identification documents.

11. A computer-implemented method for providing remote access to content stored in a virtual safebox, the method implemented using a computing device including a processor in communication with at least one memory device for storing data, the computing device in communication with a virtual vault database and a distributed network of a plurality of designated safebox access computing devices, said method comprising:
storing, in the virtual vault database, a plurality of virtual safeboxes associated with a respective plurality of users, each virtual safebox including content that is accessible using a user identifier identifying the user that is a registered owner of the virtual safebox, the content is selected by the respective user during a registration process, wherein the content includes i) image content representing personal identification documents of the respective user, and ii) a payment account identifier, and iii) a user selected credit limit for funds that may be withdrawn by the user from the virtual vault database using the identified payment account, and wherein the content selected by users is accessible via the distributed network of designated safebox access computing devices including access to withdraw at least a portion of the funds of the selected credit limit;
receiving an access request message from a first safebox access computing device of the distributed network of designated safebox access computing devices, the access request message including a first user identifier of a first user of the first safebox access computing device, the first user identifier associated with a first virtual safebox stored in the virtual vault database;
in response to receiving the access request message, retrieving, from the virtual vault database, content items contained within the first virtual safebox by performing a lookup operation using the first user identifier;
determine if a content item is unavailable at the first safebox access computing device;
in response to determining that at least one content item is unavailable at the first safebox access computing device, transmitting a request message to one or more safebox access computing devices to identify an alternative safebox computing device from the plurality of designated safebox access computing devices that has the capability to provide the unavailable content item and a location of the alternative safebox computing device;
transmitting an inventory message to the first safebox access computing device, the inventory message including an inventory list identifying each content item of the content stored in the first virtual safebox and instructions that cause the first safebox access computing device to present the inventory list on a display of the first safebox access computing device and when one or more content items are unavailable at the first safebox access computing device, present on the display a location of the alternative safebox computing device at which the content items are available;

receiving a content retrieval message from the first safebox access computing device, the content retrieval message including a request to retrieve a user-selected first content item, included in the inventory list, from the content stored in the first virtual safebox including a user request to withdraw a physical payment card issued to the first user, the physical payment card including at least a portion of the funds of the selected credit limit of the first virtual safebox; and transmitting a content message to the first safebox access computing device, the content message including the requested first content item including the portion of the funds of the selected credit limit, the content message prompting delivery of a physical payment card issued to the first user having the portion of the funds linked thereto.

12. The method according to claim 11, wherein the content stored in the first virtual safebox also includes payment credentials associated with a payment account of the first user from which funds can be withdrawn, wherein the first content item includes funds from the payment account, and wherein said method further comprises:

generating the record of receipt of the first content item including at least one of an updated balance of the payment account or an updated credit limit of the payment account.

13. The method according to claim 11, wherein each virtual safebox further stores one or more identification credentials that uniquely identify the respective user and that were previously provided by the user by the respective user to the computing device for storage in the virtual vault database, said method further comprising:

receiving an authentication request message from the first safebox access computing device, the authentication message including the first user identifier and one or more input identification credentials provided by the first user to the first safebox access computing device;

in response to receiving the authentication request message, parsing the stored identification credentials from the first virtual safebox;

comparing the input identification credentials and stored identification credentials to determine whether the input identification credentials match the stored identification credentials; and when the input identification credentials match the stored identification credentials, transmitting an authentication response message to the first safebox access computing device, the authentication response message including an indication that authentication of the first user was successful and the first user is authorized to view the inventory list.

14. The method according to claim 11, further comprising:

in response to determining that the first safebox access computing device does not have a capability to provide the first content item to the first user;

identifying an alternative safebox access computing device of the distributed network of designated safebox access computing devices that has the capability to provide the first content item to the user, determine a geographic location of the first safebox access computing device;

compare the location of the first safebox to locations of the one or more alternative safebox access computing devices to determine the nearest alternative safebox; and transmitting a recommendation message to the first safebox access computing device, wherein the recommendation message includes an identification and a location of the alternative safebox access computing device and instructions for the first access computing device to provide the identification and location of the alternative safebox access computing device to the first user.

15. A non-transitory computer-readable storage medium that includes computer-executable instructions, wherein when executed by a computing device comprising a processor and in communication with a virtual vault database and a distributed network of a plurality of designated safebox access computing devices, the computer-executable instructions cause the processor to:

store, in the virtual vault database, a plurality of virtual safeboxes associated with a respective plurality of users, each virtual safebox including content that is accessible using a user identifier identifying the user that is a registered owner of the virtual safebox, the content is selected by the respective user during a registration process, wherein the content includes i) image content representing personal identification documents of the respective user, ii) a payment account identifier, and iii) a user selected credit limit for funds that may be withdrawn by the user from the virtual vault database using the identified payment account, and wherein the content selected by users is accessible via the distributed network of designated safebox access computing devices including access withdraw to at least a portion of the funds of the selected credit limit;

receive an access request message from a first safebox access computing device of the distributed network of designated safebox access computing devices, the access request message including a first user identifier of a first user of the first safebox access computing device, the first user identifier associated with a first virtual safebox stored in the virtual vault database;

in response to receiving the access request message, retrieve, from the virtual vault database, content items contained within the first virtual safebox by performing a lookup operation using the first user identifier;

determine if a content item is unavailable at the first safebox access computing device;

in response to determining that at least one content item is unavailable at the first safebox access computing device, transmit a request message to one or more safebox access computing devices to identify an alternative safebox computing device from the plurality of designated safebox access computing devices that has the capability to provide the unavailable content item and a location of the alternative safebox computing device;

transmit an inventory message to the first safebox access computing device, the inventory message including an inventory list identifying each content item of the content stored in the first virtual safebox and instructions that cause the first safebox access computing device to present the inventory list on a display of the first safebox access computing device and when one or more content items are unavailable at the first safebox access computing device, present on the display a location of the alternative safebox computing device at which the content items are available;

receive a content retrieval message from the first safebox access computing device, the content retrieval message including a request to retrieve a user-selected first content item, included in the inventory list, from the content stored in the first virtual safebox including a user request to withdraw a physical payment card issued to the first user, the physical payment card including at least a portion of the funds of the selected credit limit of the first virtual safebox; and transmit a content message to the first safebox access computing device, the content message including the requested first content item including the portion of the funds of the selected credit limit, the content message prompting delivery of a physical payment card issued to the first user having the portion of the funds linked thereto.

16. The non-transitory computer-readable storage medium according to claim 15, wherein the computer-executable instructions further cause the processor to:

receive a receipt message from the first safebox access computing device, the receipt message including the first user identifier and an indication of receipt of the first content item; and store a record of the receipt of the first content item.

17. The non-transitory computer-readable storage medium according to claim 16, wherein the content stored in the first virtual safebox also includes payment credentials associated with a payment account of the first user from which funds can be withdrawn, wherein the first content item includes funds from the payment account, and wherein the computer-executable instructions further cause the processor to:

generate the record of receipt of the first content item including at least one of an updated balance of the payment account or an updated credit limit of the payment account.

18. The non-transitory computer-readable storage medium according to claim 15, wherein each virtual safebox further stores one or more identification credentials that uniquely identify the respective user and that were previously provided by the user by the respective user to the computing device for storage in the virtual vault database.

19. The non-transitory computer-readable storage medium according to claim 18, wherein the computer-executable instructions further cause the processor to:

receive an authentication request message from the first safebox access computing device, the authentication message including the first user identifier and one or more input identification credentials provided by the first user to the first safebox access computing device;

in response to receiving the authentication request message, parse the stored identification credentials from the first virtual safebox;

compare the input identification credentials and stored identification credentials to determine whether the input identification credentials match the stored identification credentials; and when the input identification credentials match the stored identification credentials, transmit an authentication response message to the first safebox access computing device, the authentication response message including an indication that authentication of the first user was successful and the first user is authorized to view the inventory list.

20. The non-transitory computer-readable storage medium according to claim 15, wherein the computer-executable instructions further cause the processor to:

in response to determining that the first safebox access computing device does not have a capability to provide the first content item to the first user, determine a geographic location of the first safebox access computing device;

identify one or more alternative safebox access computing device of the distributed network of designated safebox access computing devices that has the capability to provide the first content item to the user;

compare the location of the first safebox to locations of the one or more alternative safebox access computing devices to determine the nearest alternative safebox; and transmit a recommendation message to the first safebox access computing device, wherein the recommendation message includes an identification and location of the nearest alternative safebox access computing device and instructions for the first access computing device to provide the identification and a location of the nearest alternative safebox access computing device to the first user.

* * * * *